Oct. 9, 1956
C. LARAIA
2,766,023
MIXER
Filed April 2, 1954
2 Sheets-Sheet 1
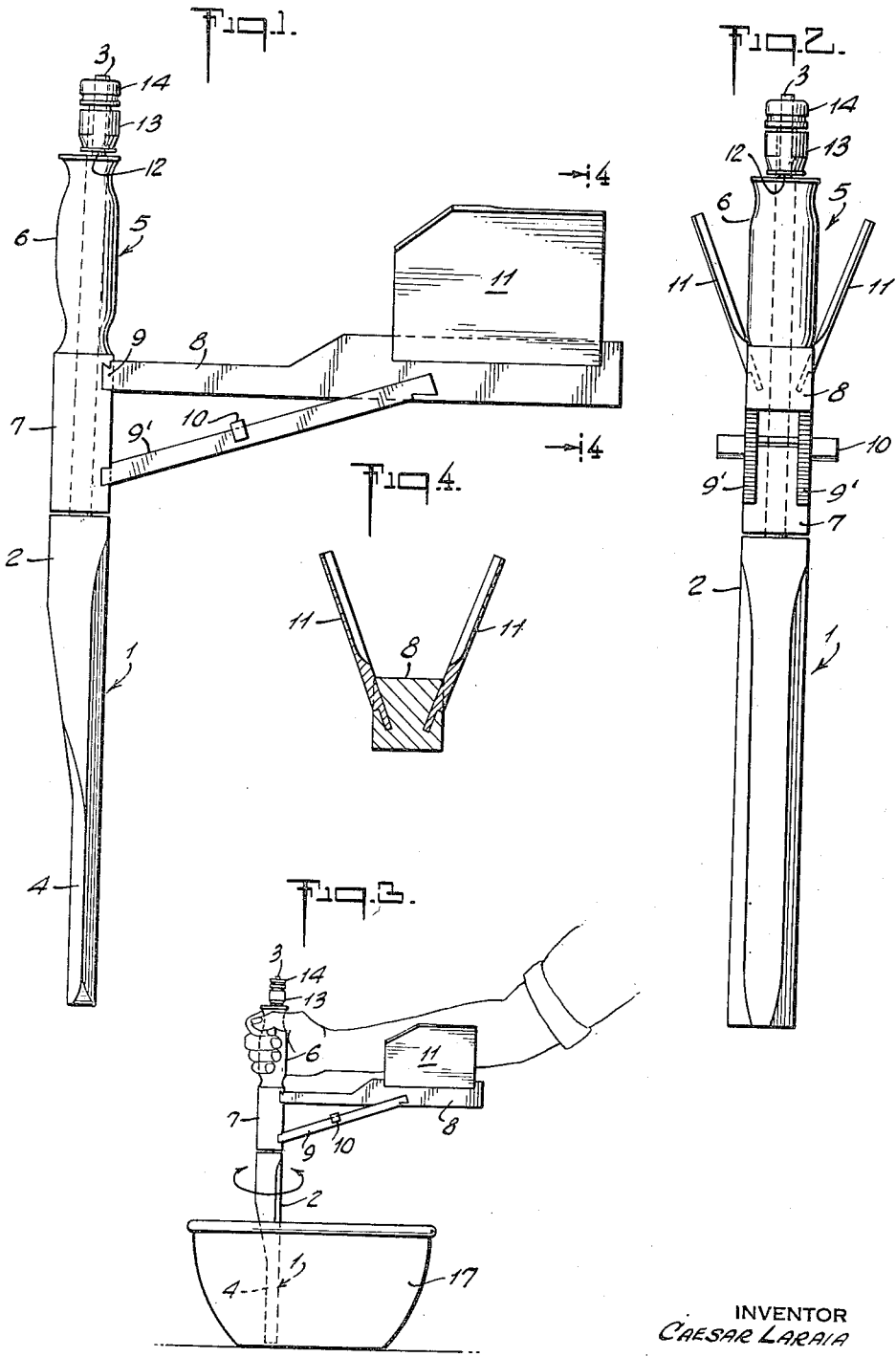
INVENTOR
CAESAR LARAIA
BY
Frank Makara
ATTORNEY Oct. 9, 1956
C. LARAIA
2,766,023
MIXER
Filed April 2, 1954
2 Sheets-Sheet 2
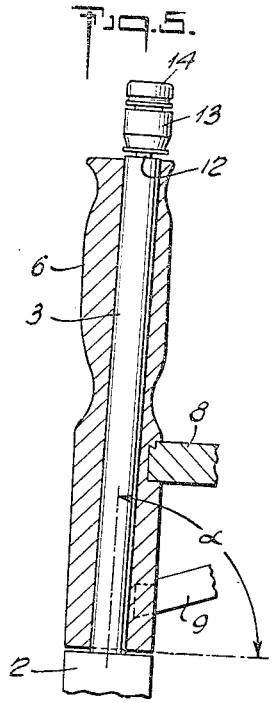
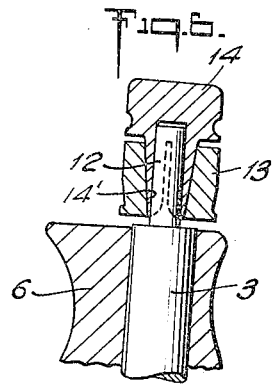
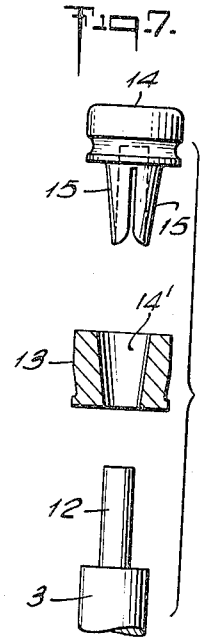
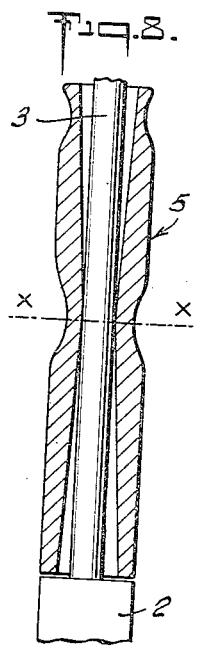
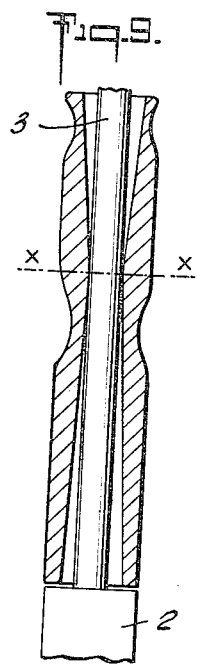
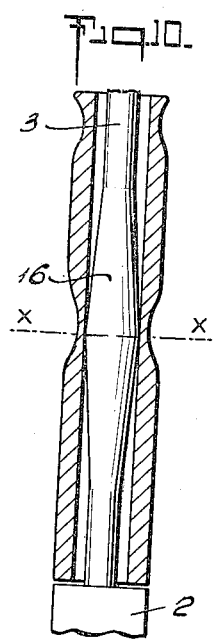
INVENTOR
CAESAR LARAIA
BY Frank Maher
ATTORNEY

United States Patent Office 2,766,023
Patented Oct. 9, 1956

2,766,023
MIXER
Caesar Laraia, Torrington, Conn.

Application April 2, 1954, Serial No. 420,582

6 Claims. (Cl. 259—144)

This invention relates to a mixer. More particularly it relates to a mixer for mixing pasty or plastic matter such as baker's batter, dough and like products.

It is an object of this invention to provide an efficient mixer for pasty or plastic material.

It is another object of this invention to provide a manually operable mixer for pasty material.

It is another object of this invention to provide a manual mixer adapted to utilize the arm muscles.

It is a further object of this invention to provide an inexpensive manually operable mixer which rapidly mixes the ingredients of a pasty mass.

These and other objects of this invention will become apparent upon reading the following disclosure taken in conjunction with the accompanying drawing in which, Fig. 1 is a side view of the mixer, Fig. 2 is a rear view of the mixer, Fig. 3 is a side view of the mixer and showing the manner of manual operation, Fig. 4 is a view taken on line 4—4 of Fig. 1, Fig. 5 is a section view through the hand grasp showing the paddle rotor spindle extending therethrough, Fig. 6 is a section view of the locking cap secured to the rotor spindle, Fig. 7 is an exploded view partly in section of the locking cap, Fig. 8 is a section view of a modified hand grasp having an hour-glass aperture and showing a rotor spindle disposed therein, Fig. 9 is another modification showing in section a hand grasp having an hour-glass aperture having the hour-glass throat displaced above the horizontal center line of said aperture, and Fig. 10 is a further modification showing in section a hand grasp having a cylindrical aperture having a barrel shaped rotor spindle therein.

This invention is an apparatus which co-actingly utilizes arm power effort exerted by the arm muscles with hand power or effort in the mixing movement of a paddle. Generically, this invention is not limited to manual operation but rather it embraces all devices working under the scientific principle set forth.

The natural movement of the forearm in conjunction with the hand in the manual mixing operation of this invention is transmitted into the movement of the mixing paddle.

The principle of operation of the device of this invention will be better understood following a description of the drawing.

In the drawing, a mixing paddle 1 is made from rotor member 2 provided with a spindle 3; preferably integrally secured thereto (Fig. 7). The rotor 2 is provided with a flat front face 4 which is disposed in the batter to be mixed (Fig. 3). This front face of the rotor may be plough shaped (not shown) for easy passage through the batter.

A hand grasp 5 is provided with a hand portion 6 and a stock portion 7. The hand portion 6 is curvatured to fit comfortably into a closed hand (Fig. 3). The stock portion 7 is of cylindrical configuration having three keyway slots therein.

An arm support 8 having a key front piece 9 integral therewith is keyed into a mating slot in the stock piece 7. A pair of removable bridge pieces 9' are keyed into corresponding slots disposed in the stock portion 7 and arm support 8. A U-shaped tie-bar 10 is clipped over the pair of bridge pieces 9 thereby locking them in place.

A pair of wings 11 are angularly and divergently disposed in slots in the arm support 8 at an angle adapted to comfortably receive the forearm.

An important feature of this invention is that the spindle 3 is disposed at an angle relative to the rotor 2. In other words, the axis of the rotor and the axis of the spindle are not in linear relationship. Stated otherwise, when the axis of the rotor is perpendicular to a horizontal plane, the axis of the spindle is alpha degrees or less than 90 degrees to the horizontal plane (Fig. 5).

This off-set relationship of the axis of the rotor relative to the axis of the spindle permits the paddle surface 4 to encounter greater batter resistance which resistance is overcome by the arm muscles.

The angle alpha of the axis of the spindle is also disposed in the hand grasp 6 (Fig. 5), said angle being inclined toward the arm support 8.

The top of the spindle 3 may be locked in place relative to the hand grasp 6 by conventional locking means. However, since the device of this invention may be made of wood, plastic, stainless steel and other material used in conjunction with food preparing equipment, I prefer a locking device which is easily locked and easily cleaned.

Turning to Figs. 6 and 7, the spindle 3 is provided with a lock prong 12 of a diameter preferably less than that of the spindle. A collar 13 having an inverted conical aperture 14' is slidably disposed over prong 12. A clip lock nut 14 having a plurality of depending, preferably four, clips 15 is adapted to receive prong 12 between the clips 15 and to engage frictionally the surface of the conical aperture 14. The insertion of nut 14 into the collar 13 causes the clips 15 to seize the prong 12 in locking engagement.

A modified device of this invention is shown in Fig. 8. In this modification the spindle 3 axis and the rotor 2 axis may be in linear relationship, but the tubular aperture of hand grasp 5 receiving the spindle 3 is given an hour-glass configuration. The spindle 3 contacts the hand-grasp 5 at the throat, indicated by dotted line X—X of the hour-glass tube or aperture. It follows therefore that when the rotor 2 of the paddle 1 is pushed through pasty material, the resistance encountered by the rotor 2 causes it and the spindle 3 fixed thereto to rock back-and-forth. This rocking action effects a better mixing of the batter. In the modification of Fig. 8 the throat of the hour-glass aperture is disposed substantially in the middle of the longitudinal length of the hand grasp 5. However, shown in Fig. 8 the hour-glass configuration may have its throat disposed in the hand portion 6 or the stock portion 7, in other words in spaced relationship to the center or middle line of the longitudinal tube of the hand grasp 5. In the modification of Fig. 9 the throat is disposed above the center line of the hand grasp thereby permitting a greater rocking action of the spindle 3 within the tube or aperture of the hand grasp 5. In the modification of Fig. 1, the transverse tubular aperture of the hand grasp 5 is of a diameter substantially equal to the diameter of the spindle. In the hour-glass modifications of Figs. 8 and 9, the diameter of the spindle 3 is substantially equal to the diameter of the throat.

In Fig. 10 is shown another modification, wherein preferably the axis of the spindle 3 and the axis of rotor 2 are in linear relationship. In this modification, the spindle 3 is provided with a bulge or barrel-shaped portion 16 intermediate the ends thereof and having a maximum diameter in the center of the bulge. Also the tubular aperture of the hand grasp 5 is of a diameter to receive this maximum spindle diameter. Preferably the maximum diameter of the bulge 16 is disposed at substantially the center line of the tubular aperture within the hand grasp, but it may be disposed above or below this center line.

As in the case of the hour-glass configurations or modifications, the barrel shaped modification also effects a rocking action to the paddle 1 and thus to the rotor 2 as it is moved through the resistance of the mass of pasty material disposed in a container or bowl 17 (Fig. 3). Generally speaking, the movement, clockwise or counterclockwise of rotor 2 about the inside surface of the bowl 17 causes the rotor face 4 to plough through the material being mixed, thereby causing a single rotation of the rotor 2 relative to the hand grasp 5 while effecting a single circulatory movement in bowl 17.

This invention has been described by means of a plurality of embodiments but clearly other embodiments fall within its broad scope.

I claim:

1. A manual mixer for mixing pasty material comprising a paddle consisting of a longitudinal rotor member for engaging the pasty material and a longitudinal spindle member fixedly secured thereto, a tubular hand grasp member disposed around said spindle and having a hand portion and a stock portion, and an arm support removably secured to said stock portion, said arm support having a pair of divergently disposed wing members for receiving the forearm.

2. The apparatus of claim 1 wherein the hand grasp tubular element is provided with a tube having an hour-glass configuration and wherein said spindle engages the throat of said tubular hour-glass configuration.

3. The apparatus of claim 2 wherein said throat of said hour-glass tubular configuration is selectively disposed in the hand portion of said hand grasp.

4. The mixer of claim 1 wherein the spindle is provided with a barrel-shaped or bulging section intermediate the ends thereof and wherein the tube of said tubular hand grasp element is adapted to receive engagingly said barrel-shaped spindle.

5. A manual mixer for mixing pasty material comprising a paddle consisting of a longitudinal rotor member for engaging the pasty material and a longitudinal spindle member fixedly secured thereto, a tubular hand grasp member disposed around said spindle and having a hand portion and a stock portion, and an arm support removably secured to said stock portion, said arm support having a pair of divergently disposed wing members for receiving the forearm and means for removably securing said paddle to said hand grasp.

6. The mixer of claim 5 wherein the removable securing means consists of a clip member adapted to engage the top of said spindle member and a collar member having an inverted conical aperture disposed about said spindle and adapted to receive frictionally said clip member.

References Cited in the file of this patent

UNITED STATES PATENTS

| Number | Name | Date |
|---|---|---|
| 808,056 | Levagood | Dec. 19, 1905 |
| 1,026,973 | Christensen | May 21, 1912 |
| 2,396,975 | Verbrugge | Mar. 19, 1946 |